United States Patent [19]

Newsome et al.

[11] Patent Number: 4,562,701

[45] Date of Patent: Jan. 7, 1986

[54] COOLING APPARATUS

[75] Inventors: George Newsome, Halifax; Eric Newton, Dewsbury, both of England

[73] Assignee: Newsome Air Conditioning Limited, Elland, England

[21] Appl. No.: 628,696

[22] Filed: Jul. 6, 1984

[30] Foreign Application Priority Data

Jul. 8, 1983 [GB] United Kingdom ............... 8318604

[51] Int. Cl.[4] ............................................. F25D 17/04
[52] U.S. Cl. ....................................... 62/187; 62/427; 426/393; 426/496; 426/52 A
[58] Field of Search .................. 426/524, 496, 393; 62/186, 187, 427

[56] References Cited

U.S. PATENT DOCUMENTS 2,984,082  5/1961  Coblentz ............................. 62/427

FOREIGN PATENT DOCUMENTS

| 364560 | 12/1931 | United Kingdom . |
| 403398 | 12/1933 | United Kingdom . |
| 414037 | 7/1934 | United Kingdom . |
| 426484 | 4/1935 | United Kingdom . |
| 478541 | 1/1938 | United Kingdom . |
| 489749 | 8/1938 | United Kingdom . |
| 494431 | 10/1938 | United Kingdom . |
| 724057 | 2/1955 | United Kingdom . |
| 762677 | 12/1956 | United Kingdom . |
| 970504 | 9/1964 | United Kingdom . |
| 1265046 | 3/1972 | United Kingdom . |
| 1591819 | 6/1981 | United Kingdom . |
| 1603591 | 11/1981 | United Kingdom . |
| 0060212 | 9/1982 | United Kingdom . |

Primary Examiner—Ronald C. Capossela
Attorney, Agent, or Firm—David A. Jackson; Daniel H. Bobis

[57] ABSTRACT

The apparatus comprises an air delivery chamber and an air extraction chamber which together define a cooling zone, said delivery chamber and said extraction chamber each having a fan and said air delivery chamber having a perforated face plate through which air is delivered into said cooling zone, said delivery chamber and said extraction chamber being connected together by ducting, and a plurality of mutually co-operable dampers in said ducting for selectively controlling the amount of humidified air passing from said extraction chamber to said delivery chamber and exhaust and for selectively controlling the amount of air from atmosphere being delivered to said delivery chamber.

7 Claims, 9 Drawing Figures

COOLING APPARATUS

This invention relates to cooling apparatus, and is particularly although not exclusively concerned with apparatus for cooling bakery products such as loaves, cakes and the other similar products.

Experience has shown that in the baking and confectionery industries, the greatest single delay in the process to the finished product is that caused by waiting for baked products to cool sufficient for the products to be wrapped and/or handled for dispatch. It is not uncommon for the time taken for the baked products to cool to be several times greater than the actual baking time.

It appears that baked products such as bread, cakes and the like cool by three heat transfer processes, namely radiant cooling from the surface of the product, convection cooling from said surface, and latent cooling by loss of moisture from the product. Cooling of bakery products is predominantly due to convection cooling and latent cooling.

When bakery products are cooled naturally whilst on racks or trays over an extended period of time, latent cooling predominates because convection cooling is inefficient due to the product being surrounded by other products at the same temperature, thereby inhibiting the rate of heat transfer. Thus, the moisture loss from the product is disproportionately high as a percentage of the unbaked product charge and of the finished baked weight.

When bakery products are cooled naturally, either by static cooling on trays or racks, or by being conveyed around the bakery on conveyors - provided for the sole purpose of cooling - it is generally accepted that, for example, a large loaf baked from an initial charge weight of thirty-three ounces of mix - of which approximately 40% by weight is water - will have a finished weight, after baking and cooling, of approximately twenty eight ounces - the minimum acceptable weight as determined by the Weights and Measures Authority. Thus, there is an approximate weight loss of 20%, i.e. five ounces, as between the charge weight and the finish weight of each product. Of this five ounce weight loss, at least 1.75 ounces is attributable to cooling losses, i.e. moisture loss from the product, and the present invention seeks to provide an improved method of and apparatus for cooling bakery products which will obviate the disadvantages of known methods and apparatus.

There have been many proposals for cooling or cooling/drying products, such proposals not being confined to the baking industry, and for details of such proposals reference should be made, for example, to United Kingdom Pat. Nos. 364560, 403398, 414037, 426484, 478541, 489749, 494431, 724057, 762677, 970504, 1265046, 1591819, and 1603591, and European Pat. No. 0060212.

All of these prior proposals would not, it is thought, fulfill the objects of the present invention since they suffer one or more of the disadvantages referred to above, in that their use would undoubtedly lead to weight loss and over-drying of the bakery products to be cooled. In addition, many of the proposals would not solve the space problem of known cooling methods.

According to one aspect of the present invention, there is provided a method of cooling bakery products comprising the steps of placing a plurality of moisture containing bakery products to be cooled in a cooling zone defined by an air delivery chamber and an air extraction chamber, directing air from said delivery chamber to and across said bakery products and drawing said air from said bakery products to said extraction chamber so as to cool said products with minimum loss of moisture therefrom, and selectively re-directing the humidified air passing into the extraction chamber into the air delivery chamber, so as to maintain constant the temperature of air passing to said products.

The method may comprise the steps of selectively positioning and controlling a plurality of air control dampers so as to selectively control the amount of air from atmosphere passing to said air supply chamber, the amount of humidified air passing from the extraction chamber to exhaust, and the amount of humidified air re-directed to said air supply chamber.

According to a second aspect of the present invention, there is provided cooling apparatus comprising an air delivery chamber and an air extraction chamber which together define a cooling zone, said delivery chamber and said extraction chamber each having a fan and said air delivery chamber having a perforated face plate through which air is delivered into said cooling zone, said delivery chamber and said extraction chamber being connected together by ducting, and a plurality of mutually co-operable dampers in said ducting for selectively controlling the amount of humidified air passing from said extraction chamber to said delivery chamber and exhaust and for selectively controlling the amount of air from atmosphere being delivered to said delivery chamber.

Preferably, said ducting will include air supply ducting for delivery of air from atmosphere to the delivery chamber, air extraction ducting for discharging to exhaust air from said extraction chamber, and recirculation ducting to connect together said air supply ducting and said extraction ducting.

Each of said ductings will include a controllable damper, the damper in said air supply ducting being in advance of the connection between the air supply ducting and the recirculation ducting, and the damper in the extraction ducting being after the connection between the air extraction ducting and the recirculation ducting.

Preferably, said dampers will be selectively controlled by temperature limit control means and product temperature and humidity control means.

The perforated face plate of said air delivery chamber will preferably be composed of a synthetic plastics material, the perforations in said face plate being at predetermined spacings so as to facilitate a predetermined air flow rate. Said perforations will preferably be countersunk at their extremities remote from the front surface of said face plate.

In order that the invention may be more readily understood, an embodiment thereof will now be described by way of example, reference being made to the accompanying drawings, wherein.

Figure 1:
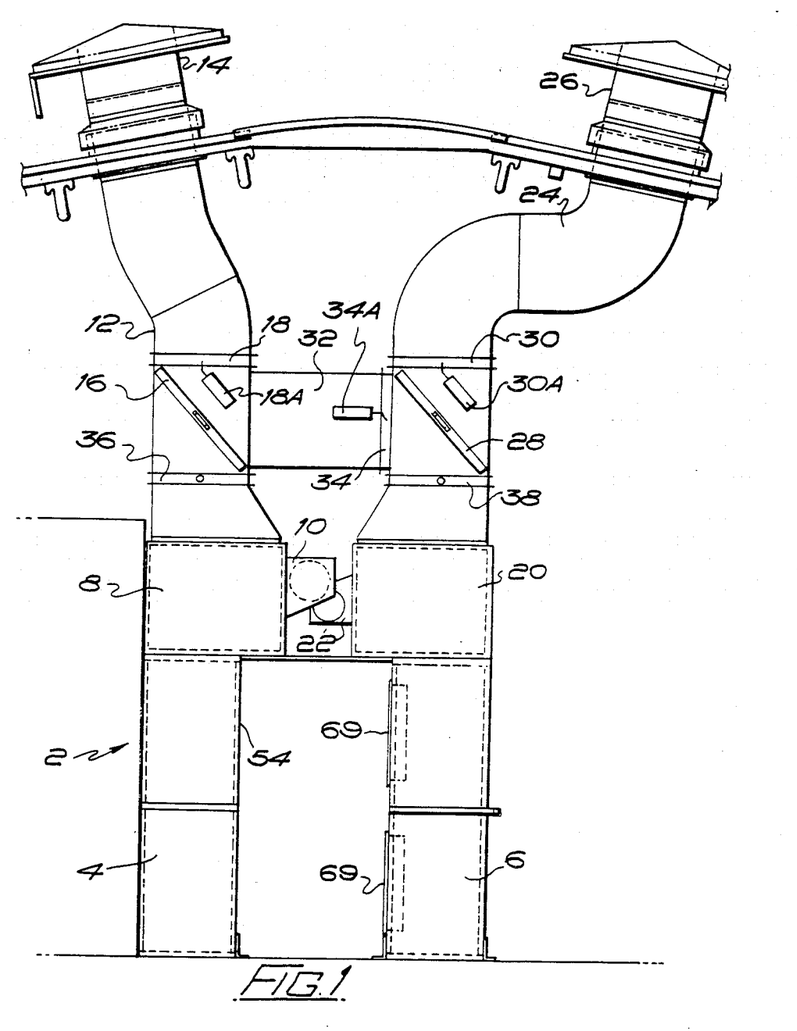
FIG. 1 is an end elevation of cooling apparatus according to the invention.

Referring to the drawings, and firstly to FIG. 1, cooling apparatus according to the invention includes a cooling zone in the form of an open-ended tunnel which is indicated generally by reference numeral 2, and which is defined by an air supply chamber 4 and an air extraction chamber 6.

Located above the air supply chamber 4 is a fan chamber 8 having a centrifugal fan 10, and air supply ducting 12 serving to connect the fan chamber 8 to atmosphere so that air from atmosphere may be supplied to said fan chamber. The ducting 12 has a cowling 14, a removable filter screen 16, and an air supply control damper 18 which is movable by a piston-and-cylinder arrangement 18A. Similarly, the air extraction chamber 6 has a fan chamber 20 having a centrifugal fan 22, and air extraction ducting 24 serving to connect the fan chamber 20 to exhaust. The ducting 24 has a cowling 26, a removable filter screen 28 and an air extraction control damper 30 movable by a piston-and-cylinder arrangement 30A. The piston-and cylinder arrangements 18A and 30A are controlled by automatic temperature sensing means.

The ducting 12 and the ducting 24 are interconnected through the intermediary of recirculation ducting 32 having a movable damper 34 which is operable by a piston-and-cylinder arrangement 34A under the influence of automatic temperature sensing means.

It will be seen from the drawings, that the damper 18 is positioned in the ducting 12 before the recirculation ducting 32 connection, that the damper 30 is positioned in the ducting 24 after the recirculation ducting 32, and that the damper 34 is positioned in proximity to the connection of the ductings 24 and 32.

In addition to the dampers 18 and 30, which as stated are movable under the influence of automatic temperature sensing means, the ductings 12 and 24 are provided with manually operable dampers 36 and 38 respectively.

Figures 2, 3:
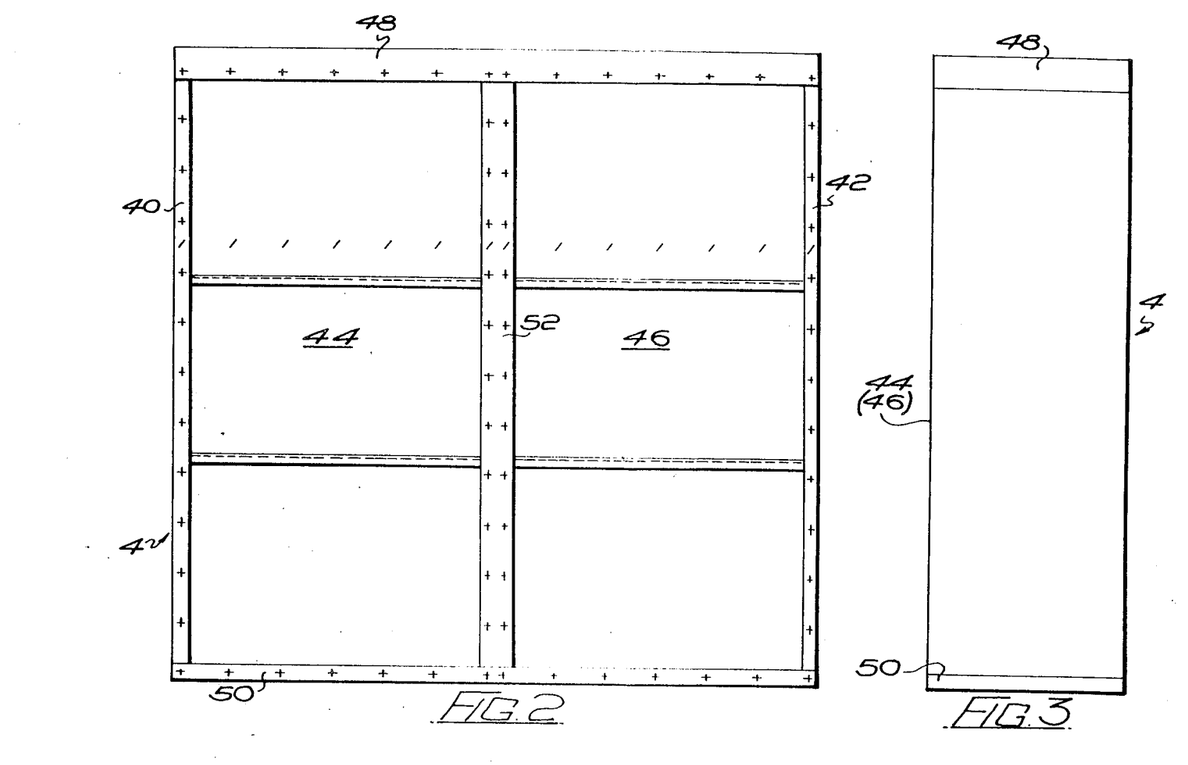
FIGS. 2 and 3 are respectively a front elevation and a side elevation of an air supply chamber of the cooling apparatus of FIG. 1 and to a larger scale.

Referring now to FIGS. 2 and 3, the air supply chamber 4 comprises a rectangular box-like structure having end walls 40 and 42, rear panels 44 and 46 - which could conveniently be replaced by a single rear panel - and top and bottom walls 48 and 50. A centre column 52 extends between said top and bottom walls.

Figure 4:
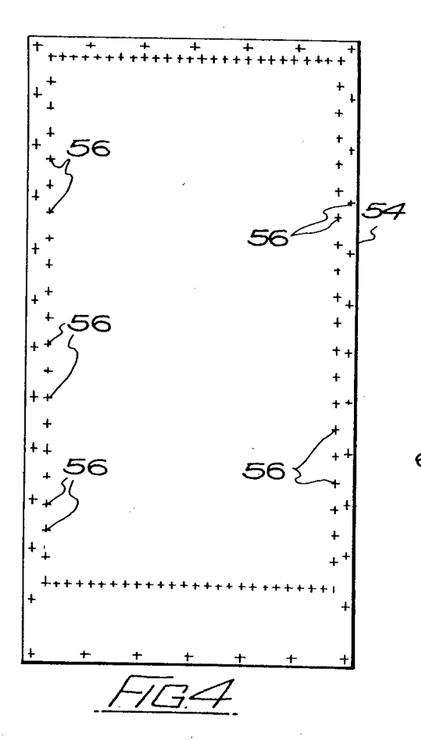
FIG. 4 is a front elevation of a face plate forming a part of the air supply chamber of FIGS. 2 and 3.
Figure 5:
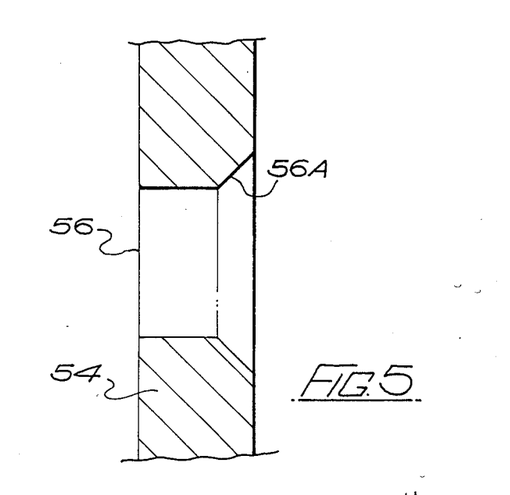
FIG. 5 is a sectional elevation, to a larger scale, of a part of the face plate of FIG. 4.

Face plates - one is indicated by reference numeral 54 in FIG. 4 - are secured to the front faces of the end walls 40 and 42, top and bottom walls 48 and 50, and centre column 52 so as to form the enclosed box-like structure, said front faces being suitably drilled or otherwise provided with means to secure said face plates to said faces. As will be seen from FIG. 4, the face plates 54 have a pluraltiy of regularly spaced holes 56 which are countersunk at their rear sides, i.e. the sides facing into the interior of the box-like structure. The form of each hole 56 will best be seen from FIG. 5, where the countersunk portion 56A is clearly indicated. Said face plates will preferably be composed of polypropylene or other synthetic plastics material, although it will be appreciated that the plates may be composed of other material such as stainless steel. In addition, the face plates 54 may be replaced by a single face plate having the requisite number of regularly spaced holes to give the required rate of air flow into the cooling zone.

Figure 6:
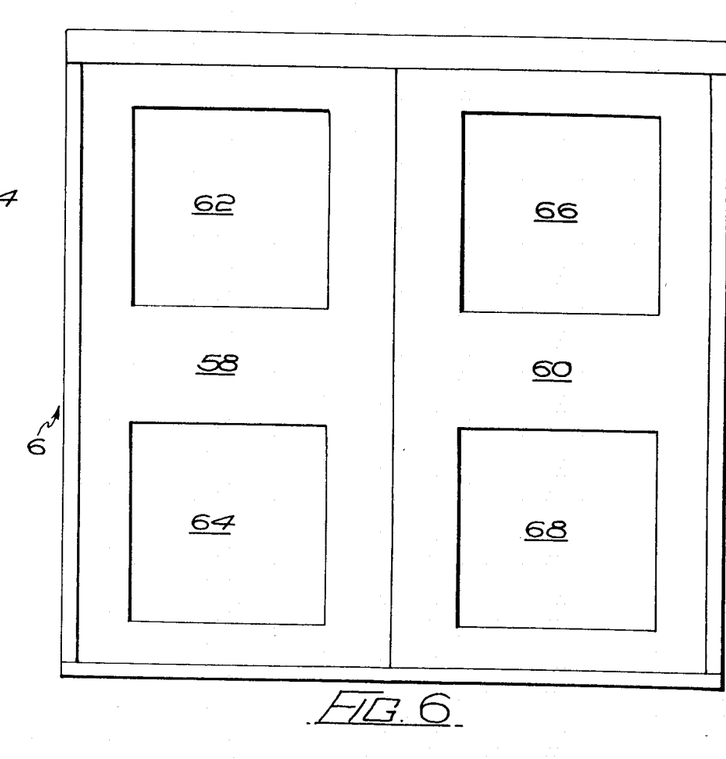
FIG. 6 is a front elevation of an air extraction chamber of the cooling apparatus of FIG. 1, and to the same scale as FIGS. 2 and 3.

The air extraction chamber 6 - referring now to FIG. 6 - is again a rectangular box-like structure having front plates 58 and 60 having cut-outs 62, 64 and 66, 68 respectively over which are fitted grilles or louvres 69, FIG. 1.

Figure 7A:
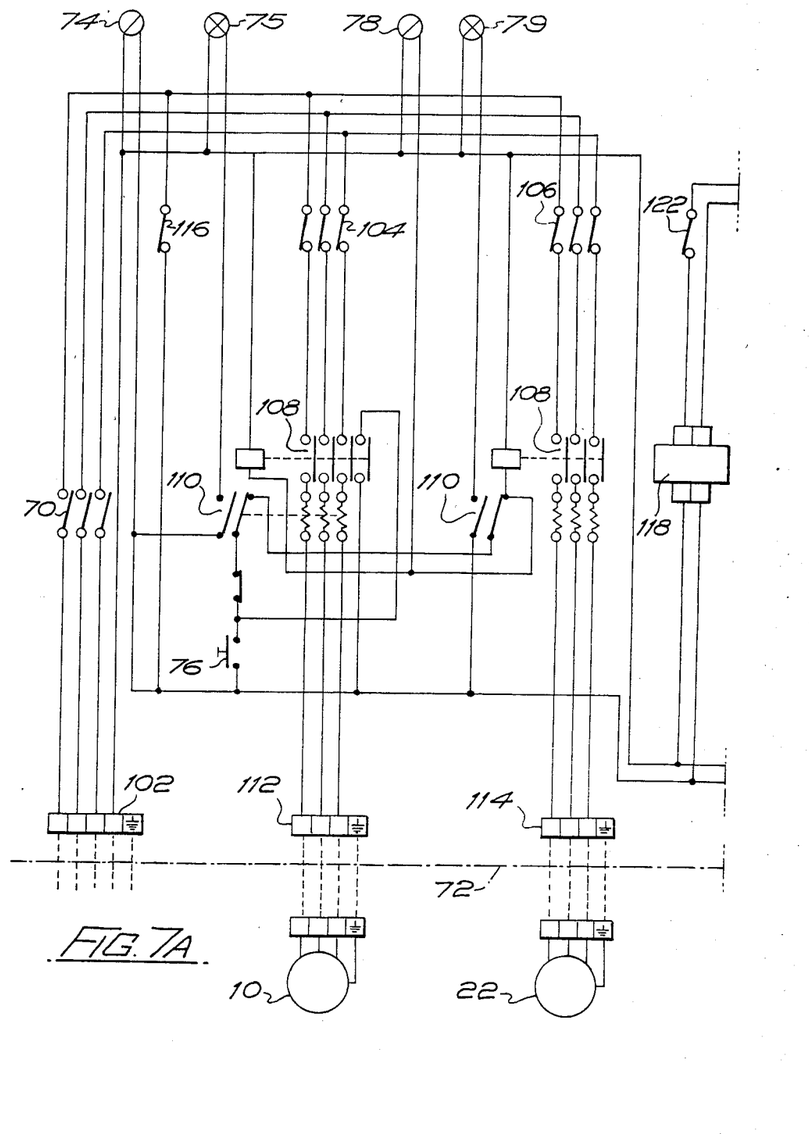
FIGS. 7A and 7B together show a circuit diagram of a control panel forming a part of the cooling apparatus of the invention.
Figure 7B:
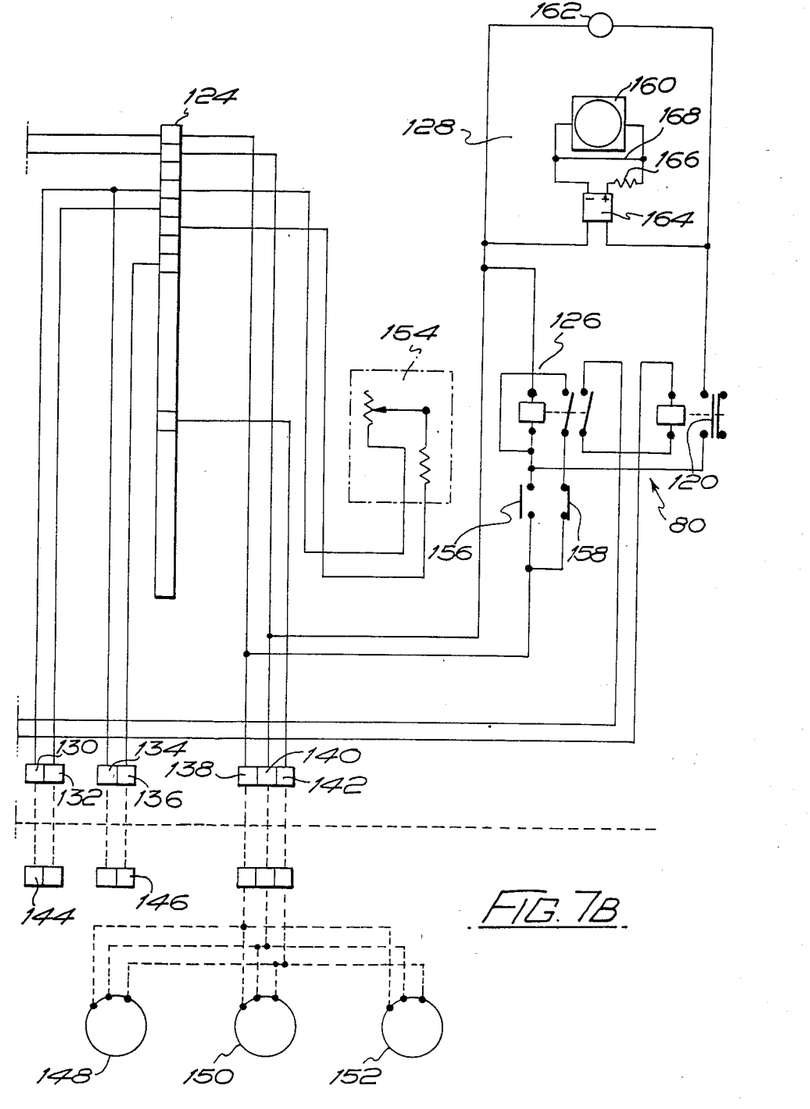
Figure 8:
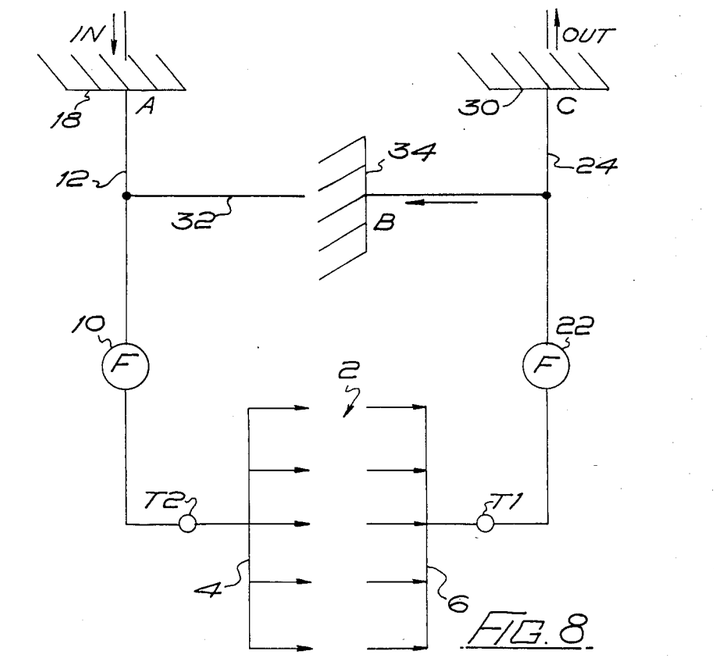
FIG. 8 is a schematic diagram of air flow control means of the cooling apparatus of the invention.

The circuit diagrams of the apparatus is shown in FIGS. 7A and 7B, and shows the marked terminal rail 102 within the panel and to which terminals the customer should connect the incoming electric supply. In addition, it shows to which terminals the panel components are wired.

The internal wiring consists of power wiring for the two fans and control wiring for all other functions.

The power wiring (3-phase and neutral) is taken from the terminal strip 102 through the isolator switch 70 to the 3 pole miniature circuit breakers 104 and 106 for the fans 10 and 22. The supply then goes to the contactors 108, overload relays 110 and to the terminal strip 112 and 114 for wiring out to the motors of the fans 10 and 22. The power for the 240 volt control circuitry is taken from one of the phases through the single pole miniature circuit breaker 116 and then to all the 240 volt control devices including indicator lamps 74, 75, 78 and 79, contactors 108, overload relays 110, transformer 118 and timer 120. The power for the 24 volt control circuitry is taken from the 240 volt control circuit through the 240/24 volt transformer 118 and single pole miniature circuit breaker 122 onto the electronic temperature controller 124, timer relay 16 and alarm circuit 128. The controller 124 is wired back to the terminals 130, 132, 134, 136, 138, 140 and 142 for connection to the temperature sensors 144 and 146 and damper actuators 148, 150, and 152. In addition the temperature controller 124 has two wires run to the temperature set point adjustment dial 154.

The alarm circuit is operated via start 156 and stop/reset 158 buttons which operate the relay 126 which activates the timer 120. When the timer 120 switches, the power is transmitted to the audio alarm 160 and indicator 162. The audio alarm 160 is 24 volt D.C. and is fed through a rectifier 164, resistor 166 and capacitor 168.

The apparatus is designed to supply coolant air to the cooling zone at a velocity of approximately 2.5 meters per second and over the product to be cooled.

In operation, the isolator switch 70 on the control panel, indicated generally by reference numeral 72, is moved to the "on" position when a green lamp 74 will be illuminated to indicate that the control circuit is operational. The termperature controls of the apparatus will now start to modulate as necessary. A push button 76 on the control panel 72 is then depressed so as to activate the air supply fan 10 and air extraction fan 22, when a green lamp 78 will be illuminated so as to indicate that the apparatus is now fully operational. When the control circuit in the main control panel 72 is on, the timer circuitry indicated generally by reference numeral 80 is operational. The control panel has a facility also for adjusting the set point for the temperature controls.

The timer 80 can be adjusted between zero and thirty six minutes - dependent upon the product being cooled - and once set, it will reset to that time at the end of each cooling cycle. When the time is set, the push button 156 is depressed to commence the cycle, this state being indicated by a red neon on the timer. When the set time has elapsed, the amber lamp will glow and a continuous tone buzzer will sound, until the cycle is reset. The temperature control system consists of an electronic module which receives signals from the temperature sensors. The electronic module operates the motions of the dampers to achieve the pre-set temperature.

The controls will control the temperature of the air as it leaves the product and will limit the air temperature onto the product (not shown) to be cooled. By this method of control, two advantages are gained. Firstly, when the product to be cooled enters the apparatus, the controls will sense that full cooling is required. In winter, this could mean a coolant air temperature of 30° F. (−1° C.) which would be harmful to the product. The low limit control will prevent the supply air temperature falling below the pre-set temperature. Secondly, by having the control sensor at the extraction side of the cooling zone, the air temperature will start to rise as the product cools (because less cooling is required) and will help to prevent over-cooling or drying of the product.

The low limit temperature set pointy is set on the controller itself by adjusting an appropriate dial. This temperature will prerably be pre-set (usually on commissioning of the apparatus) and should not require adjustment unless it is felt that the temperature is too low or too high.

The set point for the control temperature can be adjusted on the timer panel, the controls only being adjustable between outside (air from atmosphere) temperature and air recirculation temperature. The control temperature is adjustable to suit the type of product to be cooled.

A small indicator lamp on the controller indicates its output as follows:
Full brightness - 100% air from atmosphere;
Half brightness - 50% fresh air, 50% recirculation;
Lamp extinguished - 100% recirculation.

During cooling of products, a temperature detector positioned in the air extraction chamber 6 senses the temperature of the air passing from the product being cooled into the extraction chamber 6. If the air temperature starts to fall below the preset temperature which is set by the operator on the control panel, then the damper 18 in the air supply ducting 12 is modulated towards the closed position, the damper 30 in the extraction ducting 24 is modulated towards the closed position, and the damper 34 in the recirculation ducting 32 is modulated towards the open position. This allows a proportion of air - which will have been humidifed after passing over the product being cooled - to recirculate through the recirculation ducting 32 into the air supply ducting and thence through the air supply chamber 4 and onto the product, so as to satisfy the temperature requirements of the detector.

Similarly, a temperature detector positioned in the air supply chamber 4 senses the temperature of the air passing through the holes 56 in the face plates 54 into the cooling zone (tunnel) 2, and if this temperature is below that which has been preset as a low limit, then damper 18 in the air supply ducting 12 is modulated towards the closed position, the damper 30 in the extraction ducting 24 is modulated towards the closed position, and the damper 34 in the recirculation ducting 32 is modulated towards the open position. Such movement of the dampers, allows the necessary proportion of air in the extraction ducting - which as stated above will be humidified - to pass into the recirculation ducting 32 and thence into the air supply chamber 4 in order to satisfy the temperature requirements of the temperature detector and thus prevent excessively cold air striking the product which might cause damage to the product being cooled.

In order to establish that the system is operating properly, the following checks can be made.

Controls - panel isolator should be switched on. The temperature set point knob is turned to its maximum position - the damper 34 should fully open, and the dampers 18 and 30 should fully close. If the knob is then turned to the minimum position, all the dampers should start to move towards their opposite positions, it being noted that the dampers will not move fully to their opposite positions because the low temperature limit control will override this control if the air in the air supply side of the apparatus drops below the preset temperature.

Fans - panel isolator should be switched on. The push button 76 on the main panel is pressed, and the fans will make a noise as they start and the indicator lamp will illuminate. To ensure that air is being supplied the face plates 54 can be felt, and to ensure that air is being extracted a sheet of paper (or similar) can be held against the grilles of the extraction chamber 6. With the system running, all the circuit breakers in the panel should be in the "on" position.

From the above, it will be seen that coolant air supplied by the fan 10 pases from the ducting 12 into the air supply chamber 4 and thence through the holes 56 in the face plates 54 thereof and over the products (not shown) to be cooled located in the cooling zone (tunnel) 2. The fan 22 of the extraction ducting 24 then pulls the air through the grilles of the extraction chamber 6 into said chamber 6, whereafter the air is passed to exhaust or back into the air supply ducting 12 - via the recirculation ducting 32 - this being determined (or the proportions of air to exhaust and air to recirculation) by the modulating positions of the dampers 18, 30 and 34.

The products to be cooled will preferably be located on trollies (not shown) which are fed into one open end of the tunnel 2 which will preferably be of a length substantially equally to two trolley lengths. The trollies carrying the cooled products can exit from the other open end of the tunnel. If desired, guide rails may be provided in the tunnel along which the trollies may run, and means may be provided for feeding the trollies into and out of the tunnel.

With apparatus according to the invention, the usual bakehouse bottleneck caused by having to wait for baked products to cool is eliminated, since the cooling time is reduced to substantially the same as the time taken for baking. In addition, the apparatus because of its control system gives repeatable and constant cooling for each product. Cooling takes place without undue drying of the product and due to the recirculation of humidified air, over-cooling of the product is prevented. Of perhaps more importance, because the recirculated air has already passed over the product and absorbed moisture from the product, the recirculated air cannot continue to gather moisture and cause overdrying of the products. Thus over-cooling and overdrying of the products are not possible. Handling of the product is reduced, floor space is saved (due to the out of the way positioning of the fans etc.), and the number of trollies, trays, and baking tins in use are all reduced, as is the labour force required. In addition, because the cooling is controlled, the trollies, trays and baking tins finish at a constant temperature and therefore their constant temperature gives consistency to the next batch of production.

Because the cooling phase of the operation is strictly controlled, the baked products suffer less of a weight loss than would be the case with any other cooling process or with natural cooling. Thus, it is possible that the scaling weight of the dough piece to be baked can be reduced, and yet the finished product can attain the required finished weight.

It will be appreciated that apparatus according to the invention may have uses other than in the baking industry.

Whilst the cooling zone, in its peferred form, is shown and described as a tunnel which is open at both ends, the tunnel may have only one end open, so that instead of the trolleys carrying the products to be cooled entering the tunnel through one end and existing through the other end, the trolleys would enter and leave by the same opening.

Where space restrictions dictate, the extraction side of the apparatus may be constituted by a wall or other partition against which the cabinet abuts, cut-outs and grilles being provided in the wall or partition to provide for extraction of the air from the cooling zone.

We claim:

1. Apparatus for cooling bakery products comprising:
   an air delivery chamber;
   an air extraction chamber spaced from and opposing said air delivery chamber to define a cooling zone therebetween through which said bakery products pass;
   said air delivery chamber and said air extraction chamber being in fluid communication with said cooling zone;
   ducting means for connecting together said air delivery chamber and said air extraction chamber to provide recirculation of air from said air extraction chamber to said air delivery chamber, for supplying fresh air to said air delivery chamber and for extracting air from said air extracting chamber;
   first fan means associated with said air delivery chamber for supplying at least one of fresh air and recirculated air to said air delivery chamber;
   second fan means associated with said air extraction chamber for removing air from said cooling zone and through said air extraction chamber;
   a plurality of mutually co-operable damper means in said ducting means for selectively controlling the ratio of recirculated air to fresh air supplied by said first fan means to said cooling zone to prevent excessive drying of said bakery products; and
   perforated face plate means in said air delivery chamber for delivering air that has been supplied to said air delivery chamber, to said cooling zone.

2. Cooling apparatus according to claim 1, wherein said ducting means includes air supply ducting for delivery of said fresh air from atmosphere to the air delivery chamber, air extraction ducting for discharging to exhaust air from said air extraction chamber, and recirculation ducting to connect together said air supply ducting and said extraction ducting.

3. Cooling apparatus according to claim 2, wherein each of said ductings includes a controllable damper, the damper in said air supply ducting being in advance of the connection between the air supply ducting and the recirculation ducting, and the damper in the extraction ducting being after the connection between the air extraction ducting and the recirculation ducting.

4. Cooling apparatus according to claim 3, wherein said dampers are selectively controlled by temperature limit control means and product temperature and humidity control means.

5. Cooling apparatus according to claim 1, wherein the cooling zone defined by said air delivery chamber and said air extraction chamber is in the form of an open-ended tunnel.

6. Cooling apparatus according to claim 1, wherein said perforated face plate of said air delivery chamber is composed of a synthetic plastics material.

7. Cooling apparatus according to claim 1, wherein the perforations in said face plate are countersunk at their extremitites remote from the front surface of said face plate.

* * * * *